United States Patent
Karpuram

(10) Patent No.: US 11,025,496 B2
(45) Date of Patent: Jun. 1, 2021

(54) SMART COMPONENT MONITORING

(75) Inventor: Venkata Ramana Karpuram, Sunnyvale, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 2118 days.

(21) Appl. No.: 12/015,348

(22) Filed: Jan. 16, 2008

(65) Prior Publication Data

US 2009/0182865 A1 Jul. 16, 2009

(51) Int. Cl.
*H04L 12/24* (2006.01)
*H04L 12/26* (2006.01)

(52) U.S. Cl.
CPC .............. *H04L 41/12* (2013.01); *H04L 43/00* (2013.01)

(58) Field of Classification Search
CPC ..... H04L 41/0803; H04L 43/00; H04L 41/12; H04L 61/1541
USPC .................................................. 709/223–226
See application file for complete search history.

(56) References Cited

U.S. PATENT DOCUMENTS

| | | | |
|---|---|---|---|
| 7,209,898 B2* | 4/2007 | Pfeiffer et al. ................... 705/51 |
| 7,222,174 B2* | 5/2007 | Kumano et al. .............. 709/224 |
| 7,359,915 B1* | 4/2008 | Bush | |
| 7,506,044 B2* | 3/2009 | Doshi et al. ................... 709/223 |
| 7,730,174 B2* | 6/2010 | Keefer ................ G06F 11/3006 709/223 |
| 8,001,607 B2* | 8/2011 | Stull ......................... H04L 9/00 726/26 |
| 8,595,246 B2* | 11/2013 | Fay ........................ G06F 16/367 707/758 |
| 2003/0028528 A1* | 2/2003 | Christensen .......... G06F 16/958 |
| 2004/0249935 A1* | 12/2004 | Jackson et al. ............... 709/224 |
| 2005/0015485 A1* | 1/2005 | Keefer ................ G06F 11/3006 709/224 |
| 2005/0216510 A1* | 9/2005 | Kautzleben et al. ...... 707/104.1 |
| 2006/0206715 A1* | 9/2006 | Cowan et al. ................ 713/176 |
| 2008/0132257 A1* | 6/2008 | Fok .......................... H04L 43/00 455/466 |
| 2008/0144613 A1* | 6/2008 | Adhikari ............. H04L 63/1408 370/389 |
| 2008/0196083 A1* | 8/2008 | Parks et al. ........................ 726/1 |
| 2008/0243900 A1* | 10/2008 | Yohanan et al. ............. 707/102 |
| 2009/0012941 A1* | 1/2009 | Schaaf ................ G06F 21/6218 |
| 2009/0150789 A1* | 6/2009 | Regnier ........................ 715/736 |
| 2014/0081990 A1* | 3/2014 | Bao ................... G06F 16/24575 707/748 |

* cited by examiner

*Primary Examiner* — James E Springer
(74) *Attorney, Agent, or Firm* — Shun Yao; Park, Vaughan, Fleming & Dowler LLP

(57) ABSTRACT

One embodiment of the present invention provides a system that automatic discovers and monitors enterprise components. During operation, the system scans an enterprise environment for an item of meta-data. Next, the system analyzes the item of meta-data to determine a monitoring instruction for a corresponding enterprise component. Finally, the system performs the monitoring instruction for the corresponding enterprise component.

18 Claims, 10 Drawing Sheets ns. More specifically, the present invention relates to a
SMART COMPONENT MONITORING

BACKGROUND

Field of the Invention

The present invention relates to enterprise computing systems. More specifically, the present invention relates to a method and an apparatus for providing smart component monitoring via component-monitoring meta-data.

Related Art

Many organizations rely extensively on enterprise applications to manage and store critical information. Often, these applications are distributed across multiple servers, databases, and appliances. This distributed framework provides for greater flexibility, performance, and redundancy, but at the same time increases the complexity of monitoring the entire system to avoid costly downtime.

In order to monitor distributed enterprise applications, organizations often use sophisticated monitoring systems that query the status of each individual piece of these applications. However, in order to do so, these monitoring systems require extensive configuration specifying each piece of the distributed enterprise application that needs to be monitored. In many cases, in order to change this configuration information, an administrator must apply a patch to the monitoring system and reboot the monitoring system and/or the system being monitored. This prevents real-time or quasi-real-time changes to the monitoring environment.

Furthermore, many administrators may not be aware of new applications or custom applications installed by users running in the enterprise framework. As a result, many applications may go unmonitored for extended periods of time. Additionally, as some applications are removed or shut down, errors are generated in the monitoring system because the removed application is not operating properly. In this case, it may be an extended period of time before an administrator can modify the system to stop monitoring the removed application. All of these problems contribute to the administrator's frustration with the monitoring system, and in some cases, can lead to the administrator ignoring alerts from the monitoring system.

Hence, what is needed is a method and an apparatus for providing smart component management and monitoring without the problems described above.

SUMMARY

One embodiment of the present invention provides a system that automatic discovers and monitors enterprise components. During operation, the system scans an enterprise environment for an item of meta-data. Next, the system analyzes the item of meta-data to determine a monitoring instruction for a corresponding enterprise component. Finally, the system performs the monitoring instruction for the corresponding enterprise component.

In some embodiments of the present invention, the system saves the item of meta-data to a meta-data tree, wherein the meta-data tree comprises multiple items of meta-data corresponding to multiple enterprise components that comprise an enterprise application.

In some embodiments of the present invention, the system receives a designation of a second meta-data tree from a user. In response to receiving the designation, the system performs monitoring instructions for the enterprise application as specified by the second meta-data tree.

In some embodiments of the present invention, the system receives a command from a user to modify the item of meta-data. In response to the command, the system modifies the item of meta-data. Finally, the system performs the monitoring instruction for the corresponding enterprise component from the modified item of meta-data without restarting a system comprising the corresponding enterprise component.

In some embodiments of the present invention, the monitoring instruction specifies a monitoring system to manage the corresponding enterprise component.

In some embodiments of the present invention, the monitoring instruction specifies a group membership of the corresponding enterprise component.

In some embodiments of the present invention, the group membership specifies an enterprise application comprising the enterprise component.

In some embodiments of the present invention, the monitoring instruction specifies central or local monitoring of the corresponding enterprise component.

In some embodiments of the present invention, the monitoring instruction instructs a monitoring system to stop managing the corresponding enterprise component.

DETAILED DESCRIPTION

Figure 1:
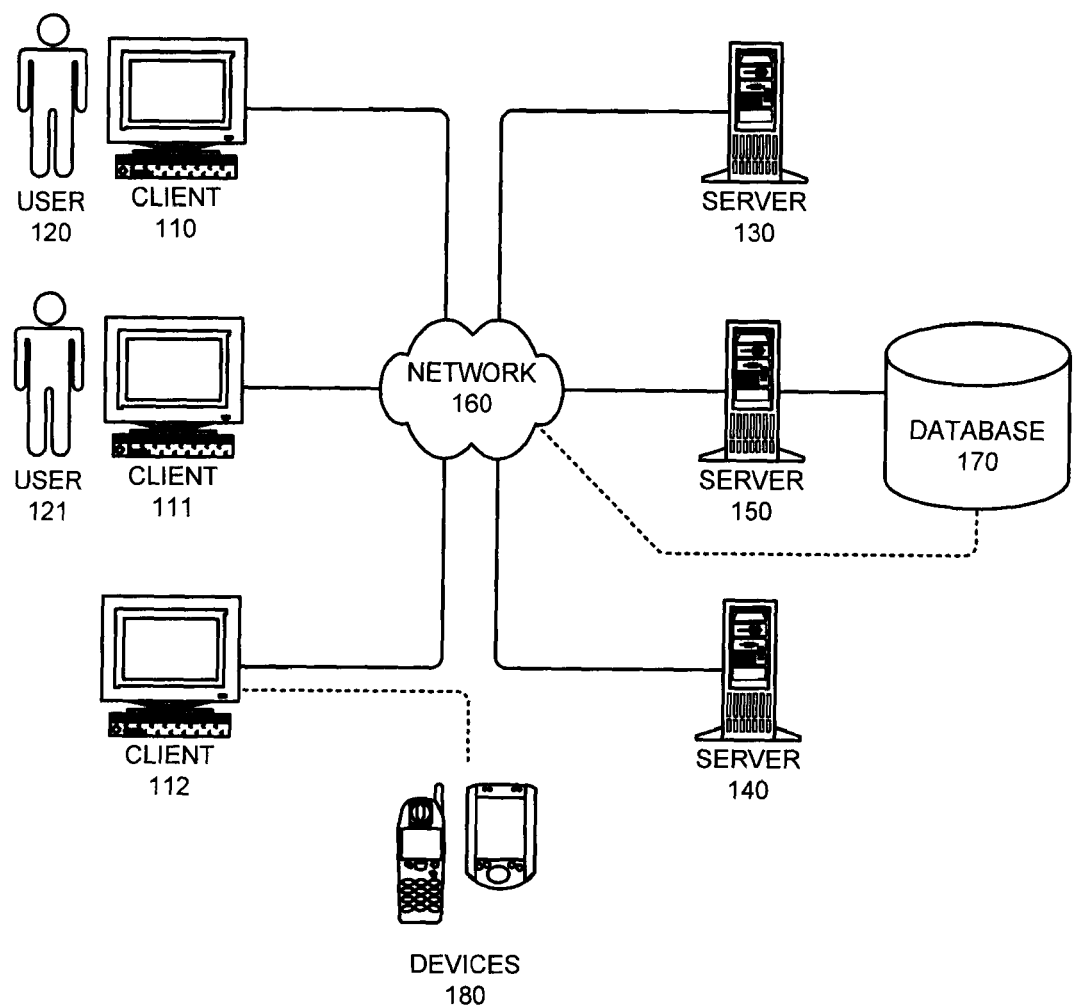
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a system that facilitates automatically identifying components to monitor in an enterprise environment. During operation, the system receives a designation of the enterprise environment. The system then identifies an enterprise application in the enterprise environment. The system also scans the enterprise application for one or more software components, wherein a software component can include a service, a database, or any other object that provides functionality to the enterprise application. The system then adds each software component to a monitor list. Next, the system determines each hardware component hosting the enterprise application and the software components. The system then adds each hardware component to the monitor list.

In some embodiments of the present invention, the system then updates each software component with the corresponding hardware component as the associated hardware. Next, the system applies the metadata processing to filter the required components as well as apply special processing to accommodate various user customizations. The various customizations may include whether the component is to be managed or not, whether the component should be grouped or not, and whether the component needs local monitoring or central monitoring or in-process-cache monitoring. Based on the connectivities or dependencies of the components on each-other, the system updates each componenet's association to other related or connected components. Finally, the system stores the monitor list to facilitate subsequent monitoring of the enterprise application.

Embodiments of the present invention can handle smart monitoring in various modes including in-memory cache, using a local or central agent in combination with in-memory cache or using a local or central agent combination with a database repository.

Note that this process takes place without the aid of an administrator or a user. In the past, an administrator would have to build the list of components to monitor. Embodiments of the present invention accomplish this task automatically by scanning the software and exploring all of the connectivites of the software. In the past, administrators typically did not have a way to express whether a component should be managed or not. This decision was made solely by the software distributor. The flexibility to add or remove components on the fly for monitoring adds tremendous advantage for administrators and end-users.

In some embodiments of the present invention, the system retrieves the monitor list. Next, the system determines each software component and each hardware component hosting the enterprise application and the software components. The system then adds each software component and each hardware component not already on the monitor list to the monitor list. The system also removes each software component and each hardware component from the monitor list that is no longer a part of the enterprise application. Finally, the system stores the monitor list a change history of the monitor list.

Note that the system may update the monitor list at any time. Updates could happen on a nightly basis, a weekly basis, or even in real or quasi-real time. In some embodiments of the present invention, the system performs an update of the monitor list every time the system performs a monitoring task for components on the monitor list.

In some situations, the update may happen via an end-user command line operation which is different from the monitoring software. In this case, the monitoring software receives a notification of such a change. The monitoring software then updates the component list by retrieving and applying the latest set of metadata, and then adds to the monitoring list.

In some embodiments of the present invention, the system retrieves the monitor list. The system also receives a modification to the monitor list from a user. Next, the system applies the modification to the monitor list. Finally, the system stores the monitor list and a change history of the monitor list.

Many occasions exist where a user or an administrator may not want to monitor some of the components detected by the system. For example, a specific component may only be attached to the network once a month for a specific job, and it may be undesirable for the system to constantly report a failure of the component when the component is not attached. Alternatively, sometimes it may be beneficial for a user to report the existence of a required component. In the case where a component is added to the system and the next update of the monitoring system is not scheduled to run for quite some time, it may be beneficial for a user or an administrator to notify the system of the new component to monitor.

In some embodiments of the present invention, for each hardware component, the system determines if the hardware component is a member of a hardware cluster. If so, the system adds the hardware cluster to the monitor list instead of the hardware component.

In some embodiments of the present invention, for each software component, the system determines if the software component is a member of a software cluster. If so, the system adds the software cluster to the monitor list instead of the software component.

Note that many clustering services and many monitoring systems have extensive cluster-monitoring tools. In these cases, it may be only necessary to identify the cluster itself.

In some embodiments of the present invention, for each software component, the system determines if the enterprise application is deployed in a software cluster. If so, the system creates an application cluster and adds it to the monitor list. Note that this helps in managing the enterprise applications as a whole, which aids in understanding the overall performance of the enterprise application in a clustered environment.

In some embodiments of the present invention, when the enterprise software is changed from clustered deployment to stand alone deployments, the system determines the change and acts accordingly by removing the application cluster from the monitoring list.

Alternatively, in some embodiments of the present invention, for each hardware component, the system determines if the hardware component is a member of a hardware cluster. If so, the system adds each hardware component of the hardware cluster to the monitor list.

Alternatively, in some embodiments of the present invention, for each software component, the system determines if the software component is a member of a software cluster. If so, the system adds each software component of the software cluster to the monitor list.

In some embodiments of the present invention, when the hardware clustering is changed to an individual hardware mode, the system determines the change and acts accordingly by removing the hardware cluster from the monitoring list.

One embodiment of the present invention provides a system that automatic discovers and monitors enterprise components. During operation, the system scans an enterprise environment for an item of meta-data. Next, the system analyzes the item of meta-data to determine a monitoring instruction for a corresponding enterprise component. Finally, the system performs the monitoring instruction for the corresponding enterprise component.

Note that the meta-data can be stored with the component, in a middleware meta-data store, or at any designated location within the enterprise environment.

In some embodiments of the present invention, the system saves the item of meta-data to a meta-data tree, wherein the meta-data tree comprises multiple items of meta-data corresponding to multiple enterprise components that comprise an enterprise application. For example, a monitoring system may be monitoring ten different applications running within an enterprise environment. In one embodiment of the present invention, each of these applications has a separate corresponding meta-data tree defining the instruction parameters for each component within each application. Note that meta-data trees may not necessarily correspond to applications in a one-to-one ratio. For example, one enterprise application with multiple modules may comprise multiple meta-data trees. Furthermore, a group of multiple small applications or applets may have one meta-data tree for the entire group.

In some embodiments of the present invention, the system receives a designation of a second meta-data tree from a user. In response to receiving the designation, the system performs monitoring instructions for the enterprise application as specified by the second meta-data tree.

Note that the presence of multiple meta-data trees for a single application or group of components allows an administrator to quickly switch between multiple monitoring profiles for the application or group of components.

In some embodiments of the present invention, the system receives a command from a user to modify the item of meta-data. In response to the command, the system modifies the item of meta-data. Finally, the system performs the monitoring instruction for the corresponding enterprise component from the modified item of meta-data without restarting a system comprising the corresponding enterprise component.

Note that changes to the meta-data may result in changes to the monitoring system in real-time or quasi-real-time without the need for patching the system or applying costly reboots.

In some embodiments of the present invention, the monitoring instruction specifies a monitoring system to manage the corresponding enterprise component. This allows for an administrator to specify different monitoring systems for different components.

In some embodiments of the present invention, the monitoring instruction specifies a group membership of the corresponding enterprise component. Components can be group in any logical method, such as by application or by module. Furthermore, components may also be grouped by underlying hardware. In some embodiments of the present invention, all components that are on the same cluster may be members of the same group.

In some embodiments of the present invention, the group membership specifies an enterprise application comprising the enterprise component.

In some embodiments of the present invention, the monitoring instruction specifies central or local monitoring of the corresponding enterprise component. In many cases, it may be beneficial to locally monitor specific components while the rest are globally monitored. In many scenarios, some critical components are locally monitored so that their security and integrity are not compromised.

In some embodiments of the present invention, the monitoring instruction instructs a monitoring system to stop managing the corresponding enterprise component. Note that this can be a temporary instruction with a specified duration of time, or can be a permanent instruction. For example, it may be ideal to stop monitoring a component for a specified period of time while a programmer modifies the component or while a system administrator upgrades hardware hosting the component. This can avoid causing exceptions in the monitoring system while the component is unavailable.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Note that different embodiments of the present invention may use different configurations, and are not limited to the configuration illustrated in computing environment 100. For example, in one embodiment of the present invention, the enterprise application being monitored is hosted entirely on server 130, while in another embodiment the enterprise application comprises server 130, server 140, server 150, and database 170.

Enterprise Environment

Figure 2:
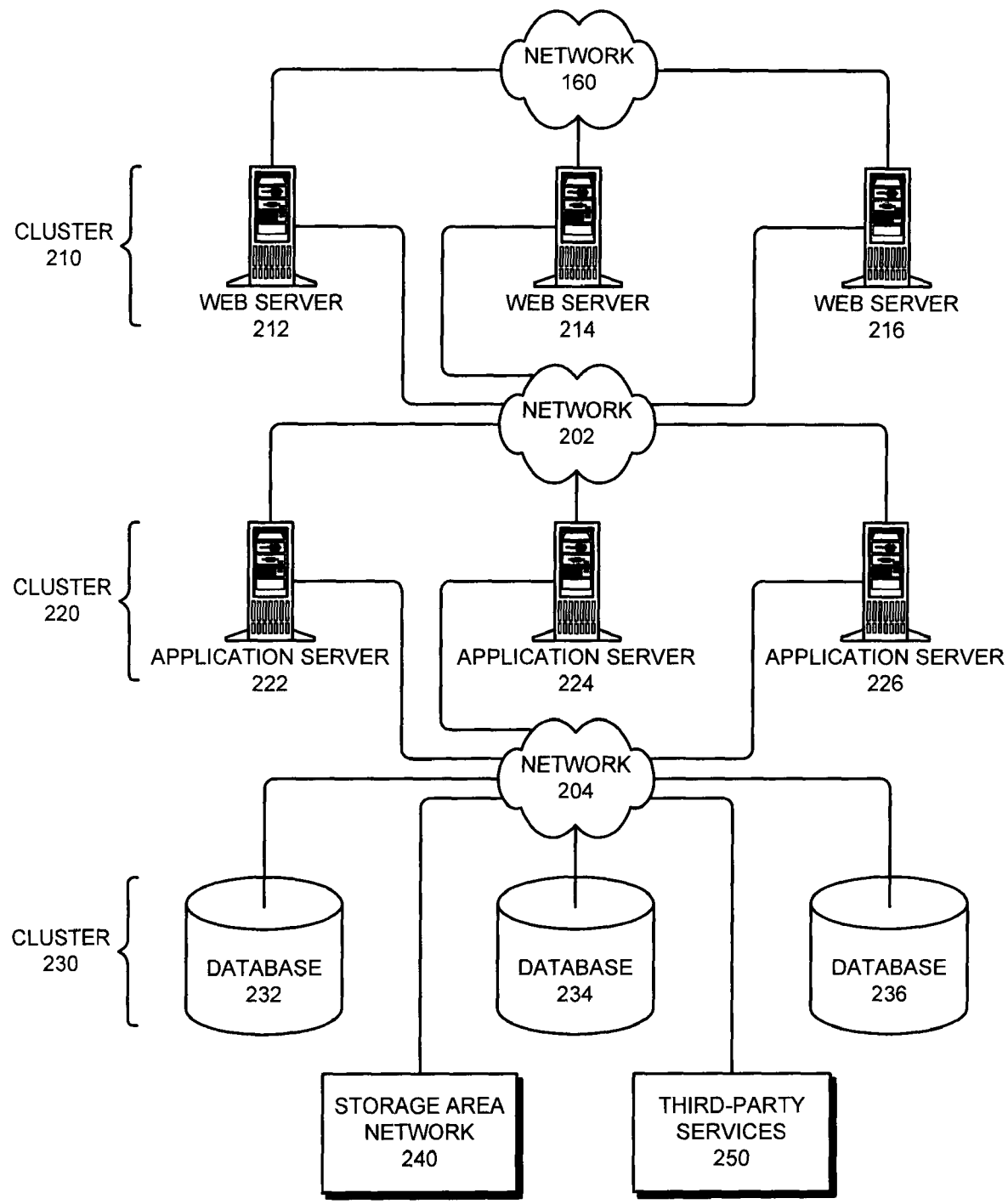
FIG. 2 illustrates an enterprise environment in accordance with an embodiment of the present invention.
Figure 3A:
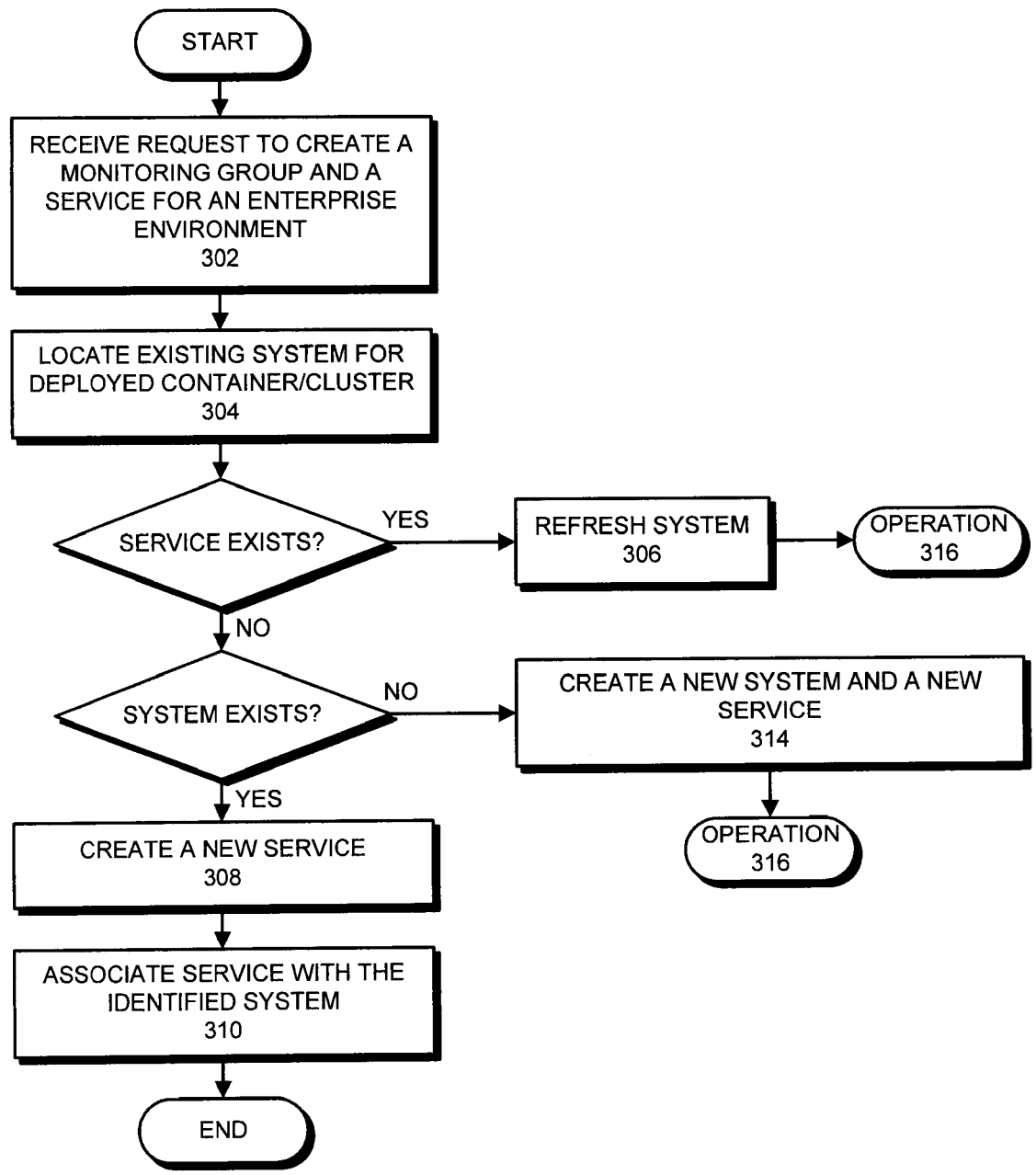
FIGS. 3A-3E present flowcharts illustrating the process of creating and maintaining a monitor list in accordance with an embodiment of the present invention.
Figure 3B:
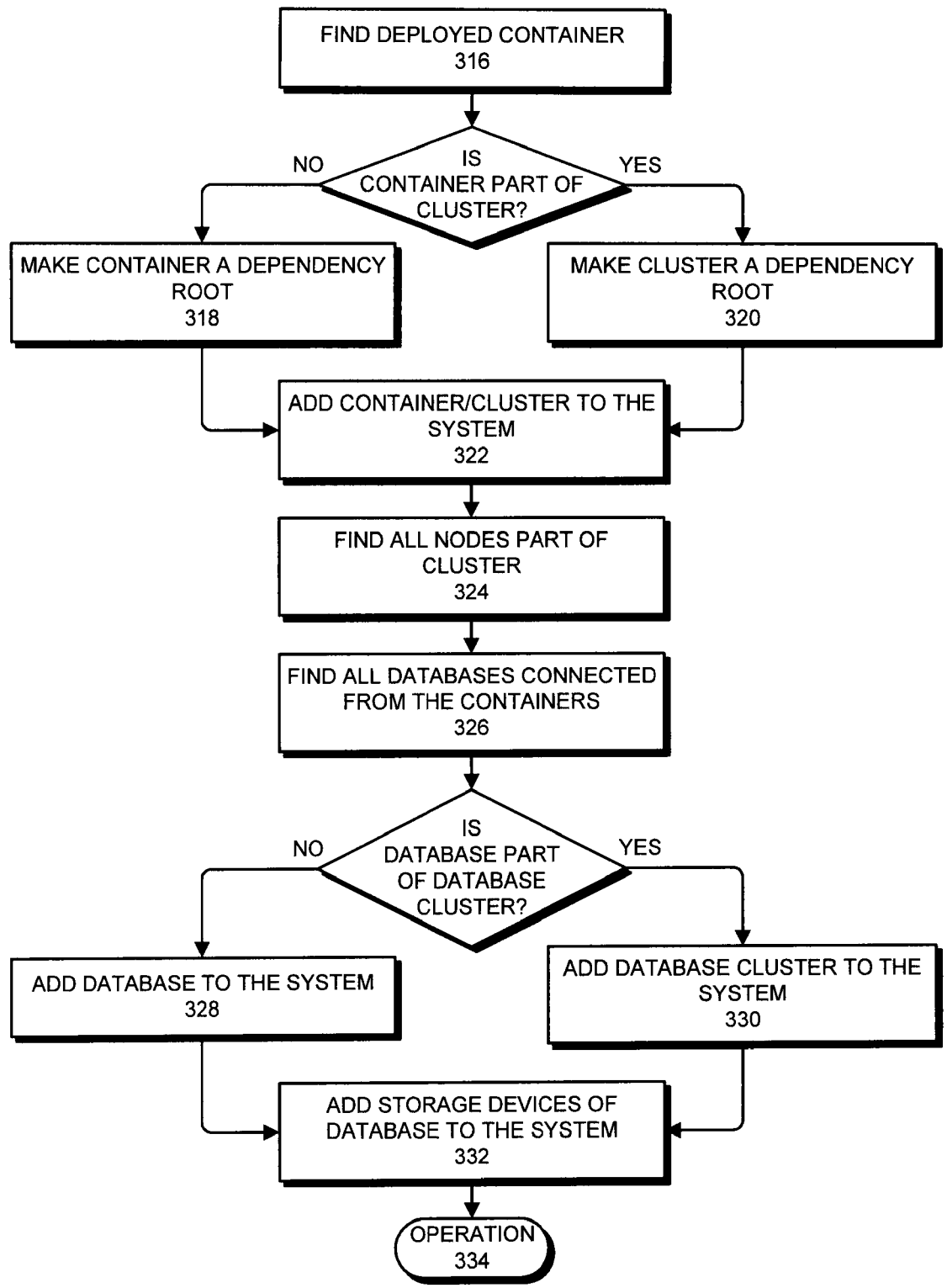
Figure 3C:
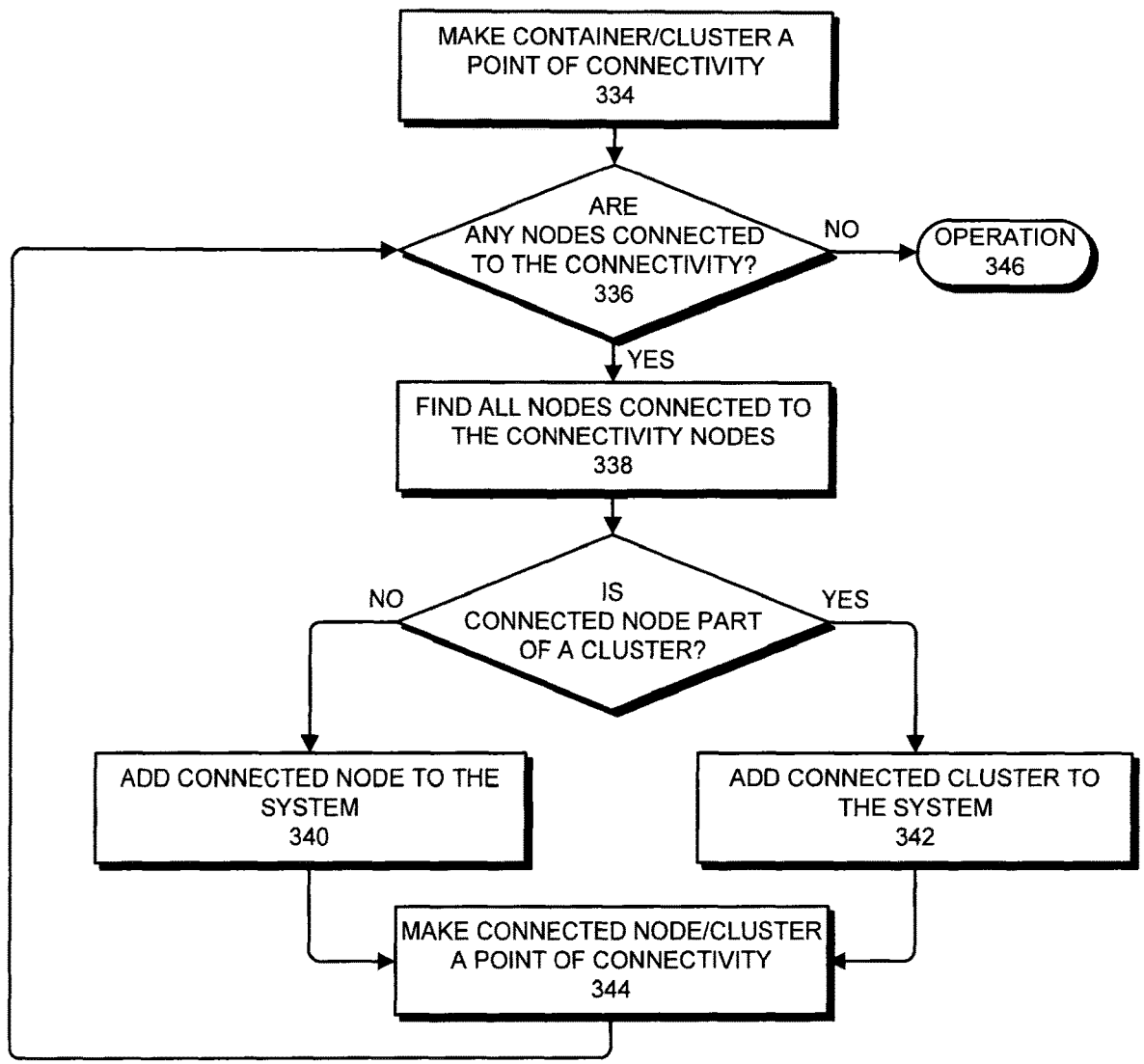
Figure 3D:
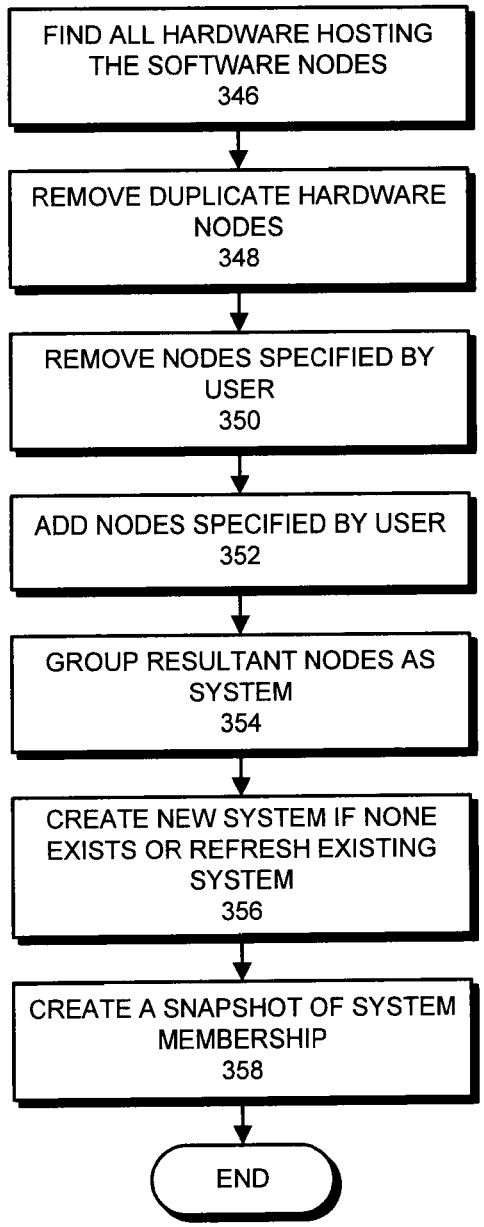
Figure 3E:
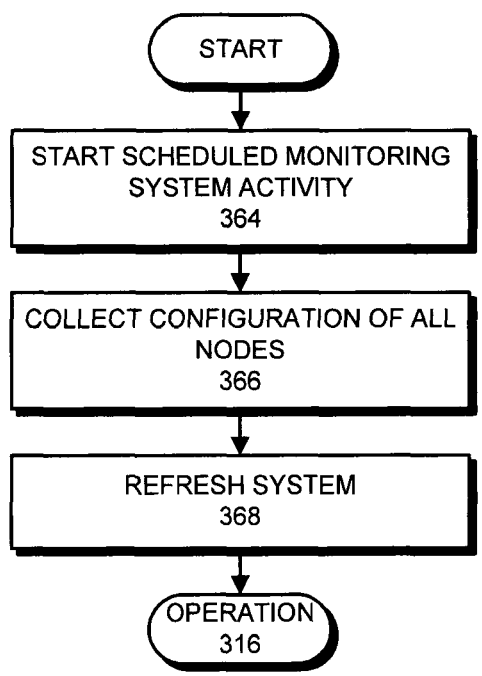

FIG. 2 illustrates an enterprise environment 200 in accordance with an embodiment of the present invention. Enterprise environment 200 comprises networks 160 and 202-204, web servers 212-216, application servers 222-226, databases 232-236, storage area network 240, and third-party services 250. Note that in some embodiments of the present invention, web servers 212-216 are member nodes of cluster 210, application servers 222-226 are member nodes of cluster 220, and databases 232-236 are member nodes of cluster 230. Any combination of clusters and stand-alone systems can be used with embodiments of the present invention. In some embodiments of the present invention, the system handles all monitoring for each mode in a cluster, while in other embodiments of the present invention, the system relies on pre-existing cluster-monitoring tools.

Enterprise Application Monitoring

FIGS. 3A-3E present flowcharts illustrating the process of creating and maintaining a monitor list in accordance with an embodiment of the present invention.

During operation, the monitoring system receives a request to creating a monitoring group and a service for an enterprise environment 200 (operation 302). Note that this request can come from a user or an administrator, such as user 120, or the request can come from a monitoring system or service. Also note that, as described herein, the monitoring groups (enterprise application deployment systems) are referred to as "systems" and the deployed applications are referred to as "services". Additionally note that "monitoring system" refers to the framework provided by embodiments of the present invention.

Next, the monitoring system locates the existing system for the deployed container and/or cluster (operation 304). The monitoring system then determines if a service exists, and if so, a system also exists, so the monitoring system refreshes the system (operation 306) and continues at operation 368. If a service does not exist, the monitoring system determines if a system exists. If a system does exist, the monitoring system creates a new service (operation 308) and associates the service with the identified system (operation 310). If a system does not exist, the monitoring system creates a new system and a new service (operation 314). Note that this operation is described in more detail starting with operation 316.

When creating a new system or refreshing an existing system, the monitoring system starts by finding deployed containers (operation 316). The monitoring system then determines if the container is part of a cluster. If the container is not part of a cluster, the monitoring system makes the container a dependency root (operation 318). However, if the container is part of a cluster, the monitoring system makes the cluster a dependency root (operation 320). Next, the monitoring system adds the container or cluster to the system (operation 322). The monitoring system then finds all nodes that are part of a cluster (operation 324)

The monitoring system also finds all databases connected from the containers (operation 326), and determines if each database is part of a database cluster. If the database is not part of a database cluster, the monitoring system adds the database to the system (operation 328). However, if the database is part of a database cluster, the monitoring system adds the database cluster to the system (operation 330).

Next, the monitoring system adds all of the storage devices of the database to the system (operation 332).

The monitoring system also makes all containers and clusters a point of connectivity (operation 334) so that the monitoring system can track down all connected hardware and software to add to the system. The monitoring system accomplishes this by determining if there are any nodes connected to each connectivity already discovered (operation 336). If not, the monitoring system continues to operation 346. However, if there are nodes connected to the connectivities, the monitoring system finds all nodes connected to the connectivity node (operation 338). The monitoring system also determines if each connected node is part of a cluster, and if not, the monitoring system adds the connected node to the system (operation 340). However, if so, the monitoring system adds the connected cluster to the system (operation 342). The monitoring system then makes each connected node or cluster a point of connectivity to facilitate discovery of additional connectivities (operation 344).

Once all of the connectivities have been discovered, the monitoring system finds all hardware hosting the software nodes (operation 346). Next, the monitoring system removes any duplicate hardware nodes (operation 348). Optionally, the monitoring system removes any nodes specified by user 120 (operation 350), and adds any nodes specified by user 120 (operation 352). Note that adding nodes specified by user 120 may include tracing all connectivities from the specified node. The monitoring system then groups all resultant nodes as a system (operation 354), creating a new system if none existed, or otherwise refreshing an existing system (operation 356). Finally, the monitoring system creates a snapshot of the system membership (operation 358).

During normal monitoring operations of the monitoring system, the monitoring system receives a request to initiate a scheduled monitoring system activity (operation 364). The monitoring system then collects the configuration of all nodes in the system (operation 366) and refreshes the system starting at operation 316 (operation 368).

Component Discovery via Component-Monitoring Meta-Data

Figure 4:
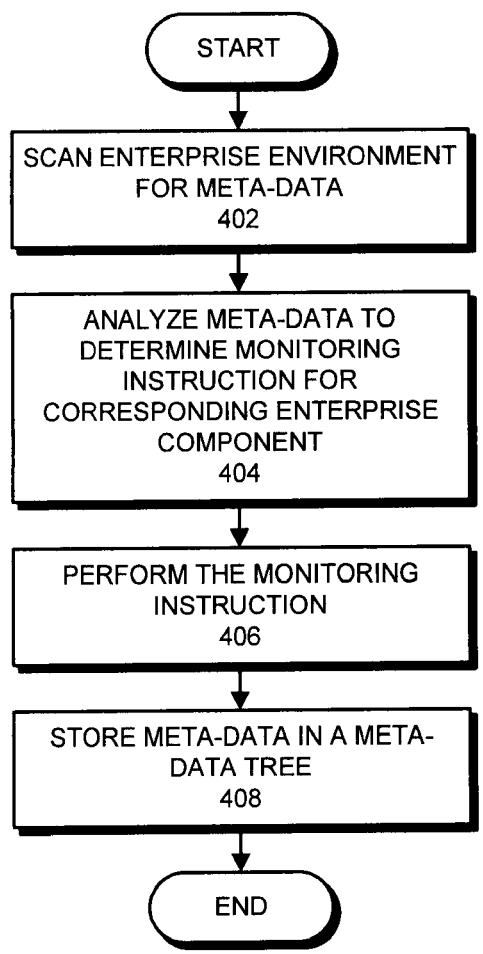
FIG. 4 presents a flowchart illustrating the process of component discovery via component-monitoring meta-data in accordance with an embodiment of the present invention.

FIG. 4 presents a flowchart illustrating the process of component discovery via component-monitoring meta-data in accordance with an embodiment of the present invention.

During operation, the monitoring system scans enterprise environment 200 for the presence of an item of meta-data (operation 402). The monitoring system then analyzes the item of meta-data to determine a monitoring instruction for a corresponding enterprise component (operation 404). Next, the monitoring system performs the monitoring instruction (operation 406). Finally, the monitoring system stores the item of meta-data in a meta-data tree (operation 408).

Component Monitoring via Component-Monitoring Meta-Data

Figure 5:
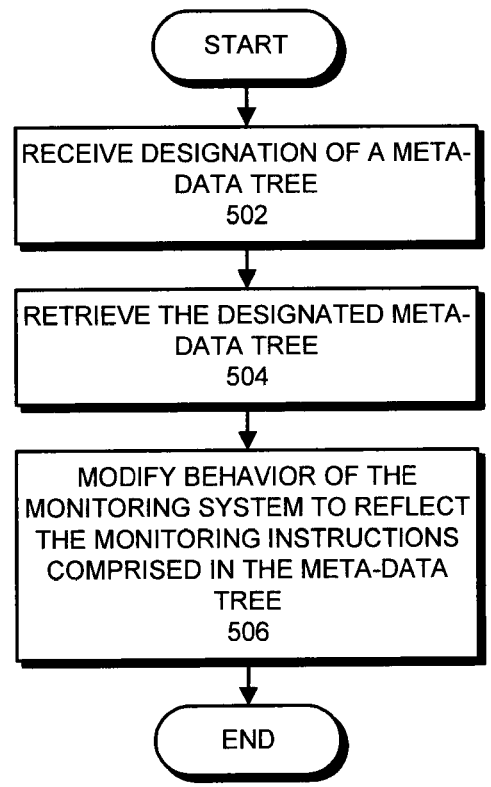
FIG. 5 presents a flowchart illustrating the process of component monitoring via component-monitoring meta-data in accordance with an embodiment of the present invention.

FIG. 5 presents a flowchart illustrating the process of component monitoring via component-monitoring meta-data in accordance with an embodiment of the present invention.

During operation, the monitoring system receives a designation of a meta-data tree from a user (operation 502). Next, the monitoring system retrieves the designated meta-data tree (operation 504). The monitoring system then modifies the behavior of the monitoring system to reflect the monitoring instructions comprised in the meta-data tree (operation 506). Note that changes to the monitoring system take place without requiring a reboot of the monitoring system or the system being monitored.

In some embodiments of the present invention, the monitoring system discovers components as described in FIGS. 3A-3E, and then automatically, builds the meta-data trees for user 120. Furthermore, in some embodiments of the present invention, some components are auto-discovered without the presence of corresponding meta-data, while others are discovered with corresponding meta-data. Note that the monitoring system may use default settings for components without corresponding meta-data, or may query user 120 for monitoring options.

Meta-Data and Component Management

Figure 6:
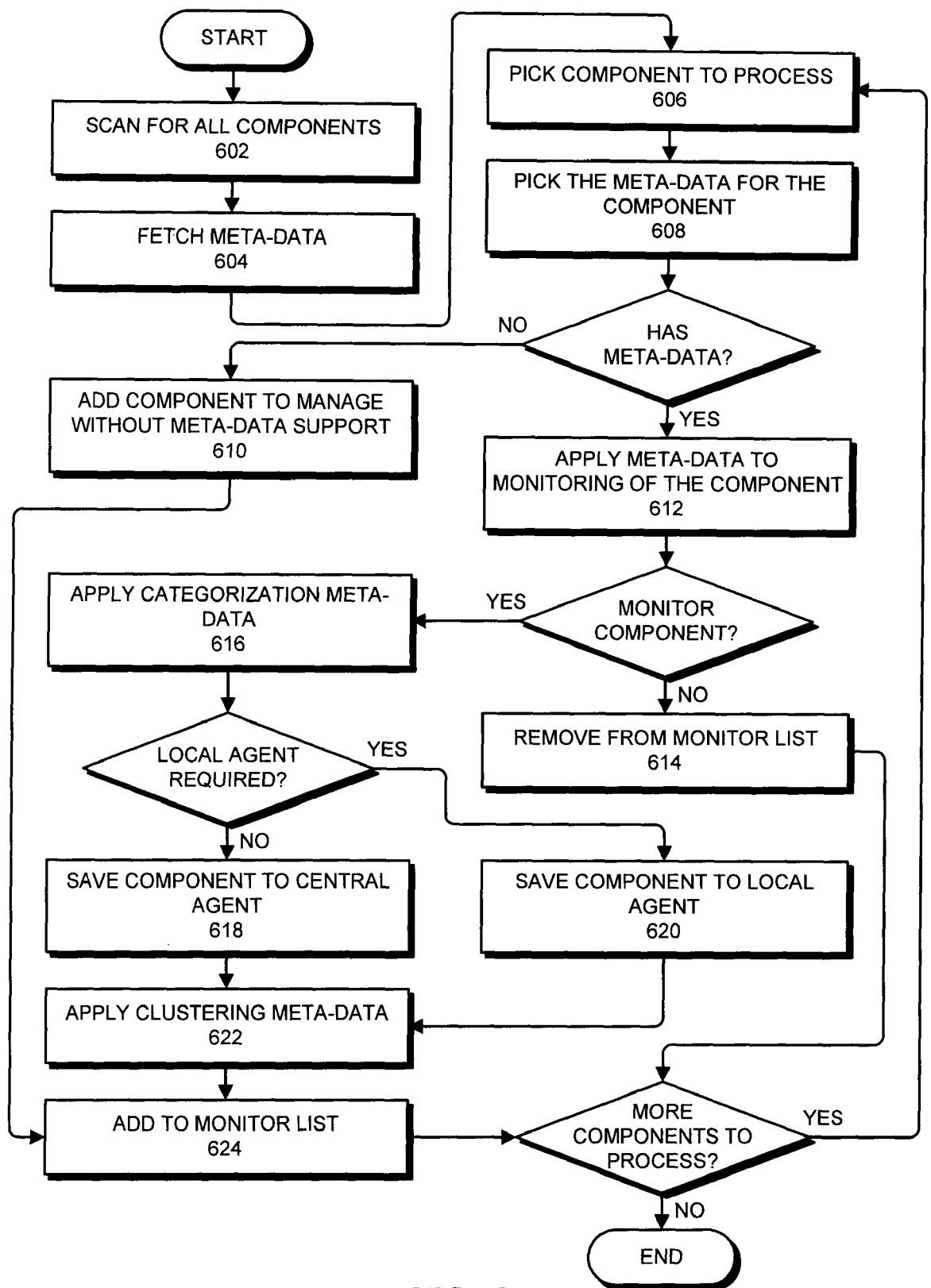
FIG. 6 presents a flowchart illustrating the process of meta-data and component management in accordance with an embodiment of the present invention.

FIG. 6 presents a flowchart illustrating the process of meta-data and component management in accordance with an embodiment of the present invention. During operation, the monitoring system scans the system for all components (operation 602). The monitoring system also fetches the component meta-data from the meta-data store (operation 604). Next, the monitoring system picks a component to process (operation 606), and picks the meta-data for the selected component (operation 608).

Note that if the selected component does not have corresponding meta-data, the monitoring system adds the component to manage without meta-data support (operation 610) and continues to operation 624. However, if the selected component does have corresponding meta-data, the monitoring system applies the meta-data to the monitoring of the component (operation 612). If the meta-data instructs the monitoring system to not monitor the component, the monitoring system removes the component from the monitor list (operation 614) and determines if there are more components to process. However, if the meta-data data instructs the monitoring system to monitor the component, the monitoring system then applies the categorization meta-data (operation 616).

Next, the monitoring system determines if a local agent is required, and if not, saves the component to the central agent (operation 618). However, if a local agent is required, the monitoring system saves the component to a local agent (operation 620). The monitoring system then applies any clustering meta-data (operation 622) and adds the component to the monitor list (operation 624). Finally, the monitoring system determines if there are more components to process, and if so, returns to operation 606. However, if there are no more components to process, the monitoring system may commence enterprise application monitoring, as described in FIGS. 3A-3E.

Updating Component Meta-Data

Figure 7:
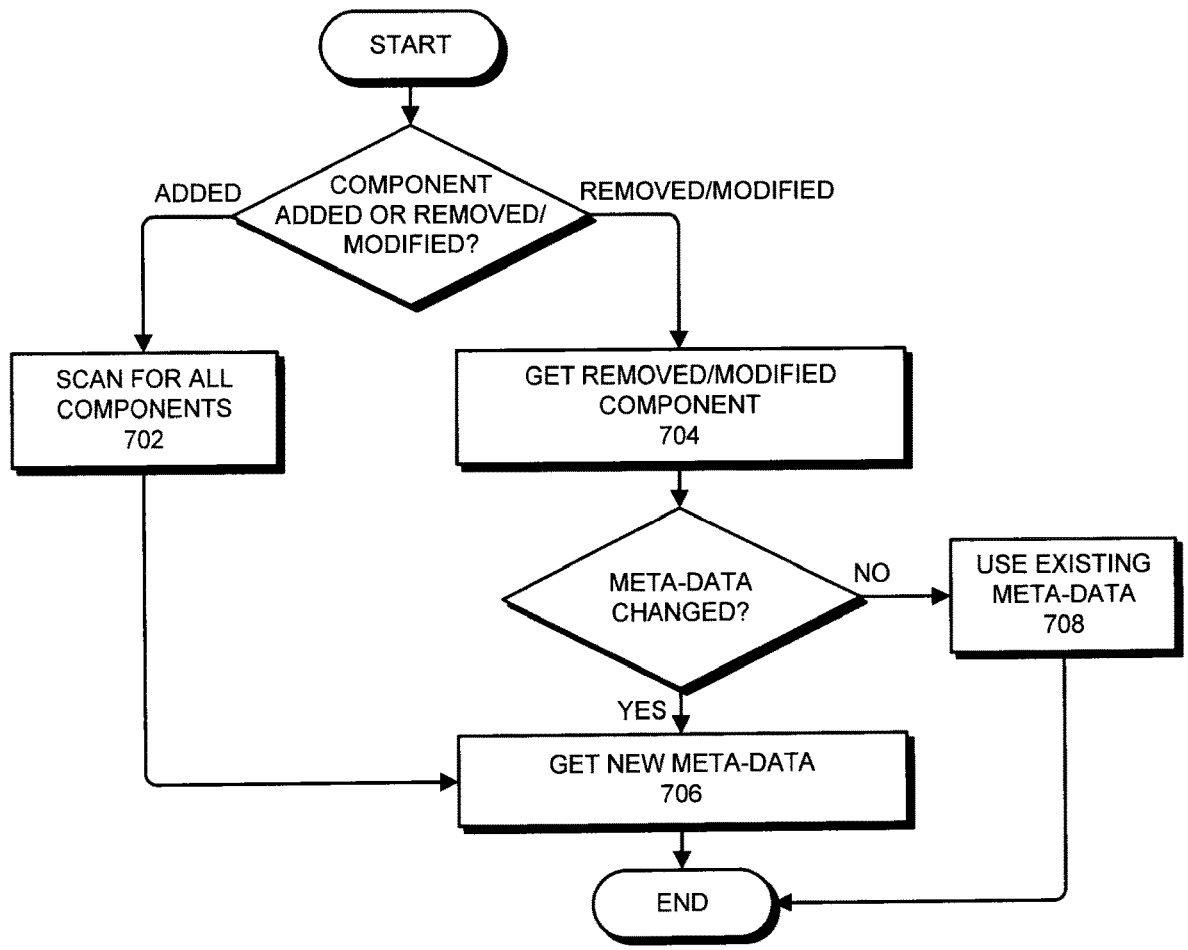
FIG. 7 presents a flowchart illustrating the process of updating component meta-data in accordance with an embodiment of the present invention.

FIG. 7 presents a flowchart illustrating the process of updating component meta-data in accordance with an embodiment of the present invention. During operation, the monitoring system determines if a component has been added, or has been removed or modified. If a component has been added, the monitoring system scans for all components (operation 702) and then gets the new meta-data (operation 706). However, if a component has been removed or modified, the monitoring system retrieves the removed or modified component (operation 704) and determines if the corresponding meta-data has changed. If not, the monitoring system uses the existing meta-data (operation 708). However, if so, the monitoring system gets the new meta-data (operation 706). Finally, the monitoring system proceeds to operation 606, as described previously.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing automatic discovery and monitoring of components, the method comprising:
   discovering a new component in an environment by scanning the environment, wherein the new component provides a functionality to an application that runs in the environment;
   scanning the environment for presence of an item of metadata associated with the new component;
   analyzing the metadata to determine whether a monitoring system is to manage the new component, wherein the monitoring system is used to manage one or more components in the environment;
   if the monitoring system is to manage the new component, performing a monitoring instruction for the new component specified in the metadata; and
   in response to receiving a temporary instruction for the new component, precluding the monitoring system from performing the monitoring instruction for the new component for a period of time specified in the temporary instruction.

2. The method of claim 1, further comprising saving the item of meta-data in a meta-data tree, wherein the meta-data tree comprises multiple items of meta-data corresponding to multiple components of the environment.

3. The method of claim 2, further comprising:
   receiving a designation of a second meta-data tree from a user; and
   in response to receiving the designation, performing monitoring instructions for the application as specified by the second meta-data tree.

4. The method of claim 1, further comprising:
   receiving a command from a user to modify the item of meta-data;
   in response to the command, modifying the item of meta-data based on the command; and
   performing a monitoring instruction in the modified item of meta-data for the new component without restarting a system comprising the new component.

5. The method of claim 1, wherein the metadata further specifies a group membership of the new component.

6. The method of claim 5, wherein the group membership specifies an application comprising the new component.

7. The method of claim 1, further comprising determining whether a local agent is needed for monitoring of the new component.

8. The method of claim 1, further comprising, if the monitoring system is to manage the new component, instructing the monitoring system to stop managing the new component.

9. A non-transitory computer-readable storage medium storing instructions that when executed by a computer cause the computer to perform a method for providing automatic discovery and monitoring of components, the method comprising:
   discovering a new component in an environment by scanning the environment, wherein the new component provides a functionality to an application that runs in the environment;
   scanning the environment for presence of an item of metadata associated with the new component;

analyzing the metadata to determine whether a monitoring system is to manage the new component, wherein the monitoring system is used to manage one or more components in the environment;

if the monitoring system is to manage the new component, performing a monitoring instruction for the new component specified in the metadata; and in response to receiving a temporary instruction for the new component, precluding the monitoring system from performing the monitoring instruction for the new component for a period of time specified in the temporary instruction.

10. The non-transitory computer-readable storage medium of claim 9, wherein the method further comprises saving the item of meta-data in a meta-data tree, wherein the meta-data tree comprises multiple items of meta-data corresponding to multiple components of the environment.

11. The non-transitory computer-readable storage medium of claim 10, wherein the method further comprises:
receiving a designation of a second meta-data tree from a user; and
in response to receiving the designation, performing monitoring instructions for the application as specified by the second meta-data tree.

12. The non-transitory computer-readable storage medium of claim 9, wherein the method further comprises:
receiving a command from a user to modify the item of meta-data;
in response to the command, modifying the item of meta-data based on the command; and
performing the monitoring instruction in the modified item of meta-data for the new component without restarting a system comprising the new component.

13. The non-transitory computer-readable storage medium of claim 9, wherein the metadata further specifies a group membership of the new component.

14. The non-transitory computer-readable storage medium of claim 13, wherein the group membership specifies an application comprising the new component.

15. The non-transitory computer-readable storage medium of claim 9, further comprising determining whether a local agent is needed for monitoring of the new component.

16. The non-transitory computer-readable storage medium of claim 9, further comprising, if the monitoring system is to manage the new component, instructing the monitoring system to stop managing the new component.

17. An apparatus configured to provide automatic discovery and monitoring of components, comprising:
a processor;
a memory;
a discovering mechanism coupled to the processor and configured to:
discover a new component in an environment by scanning the new environment, wherein the new component provides a functionality to an application that runs in the environment; and
scan the environment for presence of an item of meta-data associated with the component;
an analysis mechanism configured to analyze the metadata to determine whether a monitoring system is to manage the new component, wherein the monitoring system is used to manage one or more components in the environment; and
a monitoring mechanism configured to:
if the monitoring system is to manage the new component, perform a monitoring instruction for the new component specified in the metadata; and
in response to receiving a temporary instruction for the new component, preclude the monitoring system from performing the monitoring instruction for the new component for a period of time specified in the temporary instruction.

18. The apparatus of claim 17, further comprising a storage mechanism configured to save the item of meta-data in a meta-data tree, wherein the meta-data tree comprises multiple items of meta-data corresponding to multiple components of the environment.

* * * * *